(12) United States Patent
Celidonia et al.

(10) Patent No.: US 9,151,773 B2
(45) Date of Patent: Oct. 6, 2015

(54) SYSTEM AND METHOD FOR MONITORING AIRFLOW

(71) Applicant: General Electric Company, Schenectady, NY (US)

(72) Inventors: Brian Edward Celidonia, Lawrence Park, PA (US); Laura Susanne Cooper, Erie, PA (US); Kiran Madduri, Lawrence Park, PA (US)

(73) Assignee: General Electric Company, Schenectady, NY (US)

( * ) Notice: Subject to any disclaimer, the term of this patent is extended or adjusted under 35 U.S.C. 154(b) by 320 days.

(21) Appl. No.: 13/660,137

(22) Filed: Oct. 25, 2012

(65) Prior Publication Data

US 2014/0117977 A1    May 1, 2014

(51) Int. Cl.
| | |
|---|---|
| *G01P 3/60* | (2006.01) |
| *F16D 59/02* | (2006.01) |
| *B60K 11/00* | (2006.01) |
| *G01P 3/56* | (2006.01) |
| *F24F 13/00* | (2006.01) |

(52) U.S. Cl.
CPC .. *G01P 3/56* (2013.01); *F24F 13/00* (2013.01)

(58) Field of Classification Search
None
See application file for complete search history.

(56) References Cited

U.S. PATENT DOCUMENTS

| | | | |
|---|---|---|---|
| 4,203,058 A | 5/1980 | Chen | |
| 4,467,706 A * | 8/1984 | Batcheller et al. | 454/70 |
| 4,988,049 A * | 1/1991 | Konishi | 242/899 |
| 5,033,151 A | 7/1991 | Kraft et al. | |
| 5,255,409 A | 10/1993 | Fujiwara et al. | |
| 6,319,114 B1 * | 11/2001 | Nair et al. | 454/184 |
| 8,179,084 B2 | 5/2012 | Kumar et al. | |
| 2006/0176186 A1* | 8/2006 | Larson et al. | 340/635 |
| 2007/0118308 A1* | 5/2007 | El-Ibiary | 702/60 |
| 2012/0199039 A1 | 8/2012 | Kumar et al. | |
| 2012/0234637 A1* | 9/2012 | Marsh et al. | 188/264 A |
| 2012/0244015 A1* | 9/2012 | Benson et al. | 417/53 |

* cited by examiner

*Primary Examiner* — Melissa Koval
*Assistant Examiner* — Courtney McDonnough
(74) *Attorney, Agent, or Firm* — GE Global Patent Operation

(57) ABSTRACT

A monitoring system for a powered system includes an electric energy sensor, a rotation sensor, and a monitoring device. The electric energy sensor is coupled with a blower to measure an amount of electric energy that powers the blower to draw air through an inlet duct and over one or more bodies to cool the bodies. The rotation sensor is coupled with the blower to measure a rotation speed at which the blower operates to draw the air through the inlet duct when the blower is powered with the amount of electric energy. The monitoring device compares the rotation speed of the blower with a designated speed limit that is associated with the amount of electric energy to determine if the inlet duct is at least partially blocked. The monitoring device identifies the inlet duct as being at least partially blocked when the rotation speed exceeds the designated speed limit.

18 Claims, 7 Drawing Sheets

SYSTEM AND METHOD FOR MONITORING AIRFLOW

TECHNICAL FIELD

Embodiments of the subject matter described herein relate to monitoring airflow generated by a device, such as a blower or fan.

BACKGROUND

Some known powered systems include ventilation systems that draw and direct air to cool components in the powered systems. For example, some locomotives include dynamic brake grids that receive regenerated electric current when regenerative or dynamic braking is performed by the locomotives. The grids receive the current and convert the current into thermal energy that is dissipated by the grids. In order to prevent the grids from overheating, however, air may need to be directed over and/or through the grids to cool the grids.

Fans may be used to draw ambient air from outside of the powered system and over the grids to cool the grids. The fans can draw the air through ventilation ducts, such as inlet ducts, that provide a passageway into the interior of the powered systems. These ducts can become blocked, such as by debris including dirt, snow, and the like, during operation of the powered system. As the ducts become blocked, the fans are unable to draw as much air into the powered system and over the grids. As a result, the grids may overheat and become unusable.

In order to detect inlets that are blocked, an operator may need to periodically visually inspect the inlets. This can be difficult, if not impossible to do, however, during operation of a powered system, such as a locomotive when the locomotive is moving. Additionally, the inlets can be blocked in locations where the operator cannot see the blockage. Some systems use airflow and/or air pressure sensors to measure airflow and/or air pressure in or around the grids. These sensors, however, add a layer of complexity, cost, and maintenance to the powered systems.

A need exists for a system and method that can monitor blowers of a powered system in order to identify when an inlet is potentially blocked, such as with debris, so as to avoid damaging bodies (such as resistive grids) that are cooled by air drawn and moved by the blowers.

BRIEF DESCRIPTION

In one embodiment, a system (e.g., a monitoring system for a powered system) includes an electric energy sensor, a rotation sensor, and a monitoring device. The electric energy sensor is configured to be coupled with a blower to measure an amount of electric energy that is supplied to the blower to power the blower. When the blower is powered, the blower is configured to draw air through an inlet duct and over one or more bodies to cool the bodies. The rotation sensor is configured to be coupled with the blower to measure a rotation speed at which the blower operates to draw the air through the inlet duct and over the one or more bodies when the blower is powered with the amount of electric energy. The monitoring device is configured to compare the rotation speed of the blower with a designated speed limit that is associated with the amount of electric energy to determine if the inlet duct is at least partially blocked. The monitoring device is configured to identify the inlet duct as being at least partially blocked when the rotation speed exceeds the designated speed limit.

In another embodiment, a method (e.g., for monitoring a blower in a powered system) includes measuring an amount of electric energy that is supplied to the blower to power the blower. The blower is powered to draw air through an inlet duct and over one or more bodies to cool the bodies. The method also includes measuring a rotation speed at which the blower operates to draw the air through the inlet duct and over the one or more bodies when the blower is powered with the amount of electric energy, comparing the rotation speed of the blower with a designated speed limit that is associated with the amount of electric energy to determine if the inlet duct is at least partially blocked, and identifying the inlet duct as being at least partially blocked when the rotation speed exceeds the designated speed limit.

In another embodiment, a system (e.g., a monitoring system of a powered system) includes plural electric energy sensors, plural rotation sensors, and a monitoring device. The electric energy sensors are configured to measure electric energies supplied to different blowers in a vehicle to power the blowers so that the blowers draw air into the vehicle through one or more inlet ducts to cool resistive grids of the vehicle. The rotation sensors are configured to measure rotation speeds at which the blowers operate to draw the air into the vehicle through the one or more inlet ducts when the blowers are supplied with the respective electric energies. The monitoring device is configured to compare the rotation speeds of the blowers with respective designated speed limits that are associated with the respective amounts of electric energy to determine if the one or more inlet ducts are at least partially blocked. The designated speed limits differ for at least two or more of the blowers. The monitoring device is configured to identify the one or more inlet duct as being at least partially blocked when one or more of the rotation speeds exceed one or more of the respective designated speed limits associated with the blowers.

In another embodiment, a method comprises measuring electric energy that is supplied to a blower to power the blower. The blower is powered to draw air through an inlet duct and over one or more bodies to cool the bodies. The blower, inlet duct, and one or more bodies are associated with a powered system. The method further comprises measuring a rotation speed at which the blower operates to draw the air through the inlet duct and over the one or more bodies when the blower is powered with the electric energy. The method further comprises determining if the inlet duct is at least partially blocked based on the electric energy and the rotation speed that are measured. The method further comprises, responsive to a determination that the inlet duct is at least partially blocked, controlling a sub-system of the powered system.

In one aspect, if the inlet duct is identified as being blocked (e.g., by at least a threshold amount), then one or more responsive actions can be taken. For example, in response to determining that the inlet duct is at least partially blocked based on the electric energy and the rotation speed that are measured, one or more sub-systems of the vehicle can be controlled. These sub-systems can include a propulsion sub-system that includes one or more engines, traction motors, alternators, generators, and the like, that are used to propel the vehicle. Such a sub-system can be controlled responsive to the determination that the inlet duct is at least partially blocked by slowing down movement of the vehicle. Another sub-system can include a braking subsystem that engages brakes to slow down movement of the vehicle responsive to the determination that the inlet duct is at least partially blocked. Additionally or alternatively, the braking subsystem can restrict the use of brakes that rely on the inlet duct to cool the brakes (e.g., a dynamic braking system that uses grids that are cooled by the air drawn through the inlet duct). For example, responsive to the determination that the inlet duct is at least partially blocked, the braking subsystem may prevent use of the dynamic braking system and only allow use of the air brakes of the vehicle to stop movement of the vehicle.

BRIEF DESCRIPTION OF THE DRAWINGS

The subject matter described herein will be better understood from reading the following description of non-limiting embodiments, with reference to the attached drawings, wherein below.

DETAILED DESCRIPTION

Embodiments of the inventive subject matter described herein relate to systems and methods for monitoring airflow created by a blower (e.g., a fan). At least one embodiment relates to monitoring airflow created by a blower in order to determine if an inlet (e.g., an inlet duct) through which air is drawn by the blower is at least partially blocked (e.g., clogged with debris). Although the inventive subject matter is described with reference to a vehicle that uses blowers to draw outside (e.g., ambient) air into the vehicle to cool resistive grids within the vehicle, not all embodiments of the inventive subject matter are limited to use with vehicles or resistive grids. One or more embodiments may be used with non-vehicular systems to determine when an air inlet is at least partially blocked. As used herein, "at least partially blocked" means that an inlet, such as an inlet duct, conduit, or other airflow passageway through which air is drawn by a blower, is reduced in size by debris or other objects outside of the system that includes the blower. The inlet can be reduced in size by a variety of objects, such as snow, dirt, or other debris.

Figure 1:
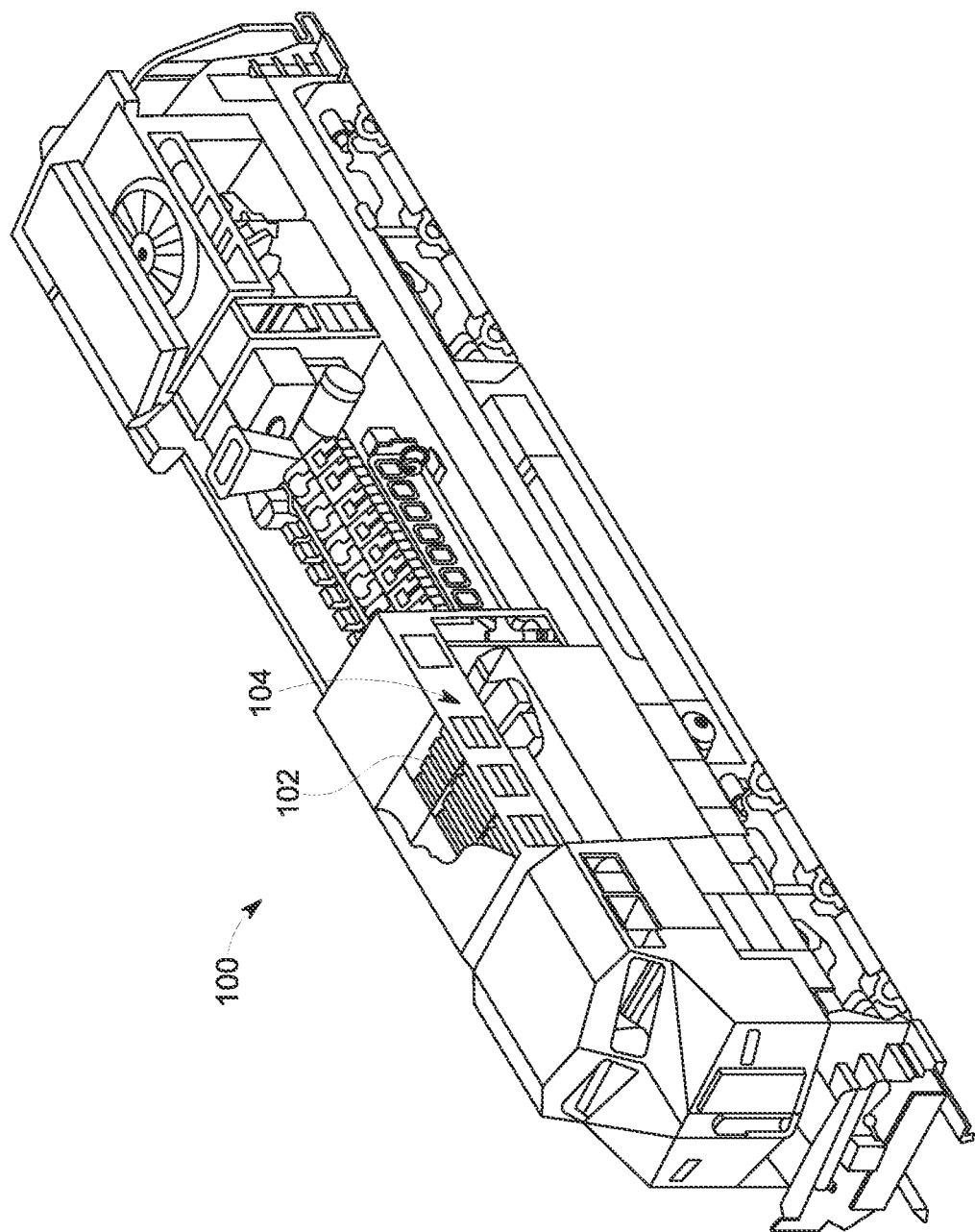
FIG. 1 illustrates a cut-away view of one embodiment of a powered system that uses a monitoring system to determine when an inlet duct is at least partially blocked.

FIG. 1 illustrates a cut-away view of one embodiment of a powered system 100 that uses a monitoring system to determine when an inlet duct of a ventilation system 104 for a braking system is at least partially blocked. The powered system 100 is shown as a vehicle, such as a locomotive or other rail vehicle. Alternatively, the powered system 100 may represent another type of vehicle, such as another off-highway vehicle (e.g., a vehicle that is not designed for travel on public roads or highways), an automobile (e.g., a vehicle that is designed for travel on public roads or highways), an airplane, a marine vessel, or the like. Alternatively, the powered system 100 may represent a stationary powered system, such as a system that uses one or more blowers to cool one or more bodies of the powered system.

The powered system 100 includes an engine, one or more traction motors, one or more generators and/or alternators, and the like, for generating propulsive force to move the powered system 100 along a route. Alternatively or additionally, the powered system 100 may include an engine, generators, alternators, and the like, for generating electric current to power one or more loads. The powered system 100 shown in FIG. 1 includes brakes, such as dynamic brakes, that slow movement of the system 100 by generating electric current in traction motors. The current that is generated can be referred to as regenerative current. This current may be used to power one or more loads of the system 100, to charge one or more energy storage devices of the system 100, and/or may be dissipated as thermal energy from electrically resistive bodies 102 of the system 100. These bodies 102 can represent dynamic braking grids of a rail vehicle, such as one or more conductive bodies that have a relatively large electrical resistance such that the current that is generated during braking is converted into heat by the bodies 102.

In order to prevent the bodies 102 from overheating, blowers (e.g., fans) can be provided onboard the powered system 100. These blowers can operate (e.g., by rotating fan blades or turbines at a rotation speed) to create airflow and draw air into the powered system 100 through a ventilation system 104 of the powered system 100. This air is directed by the ventilation system 104 over, through, and/or around the bodies 102 in order to cool the bodies 102 and prevent the bodies 102 from overheating.

Figure 9:
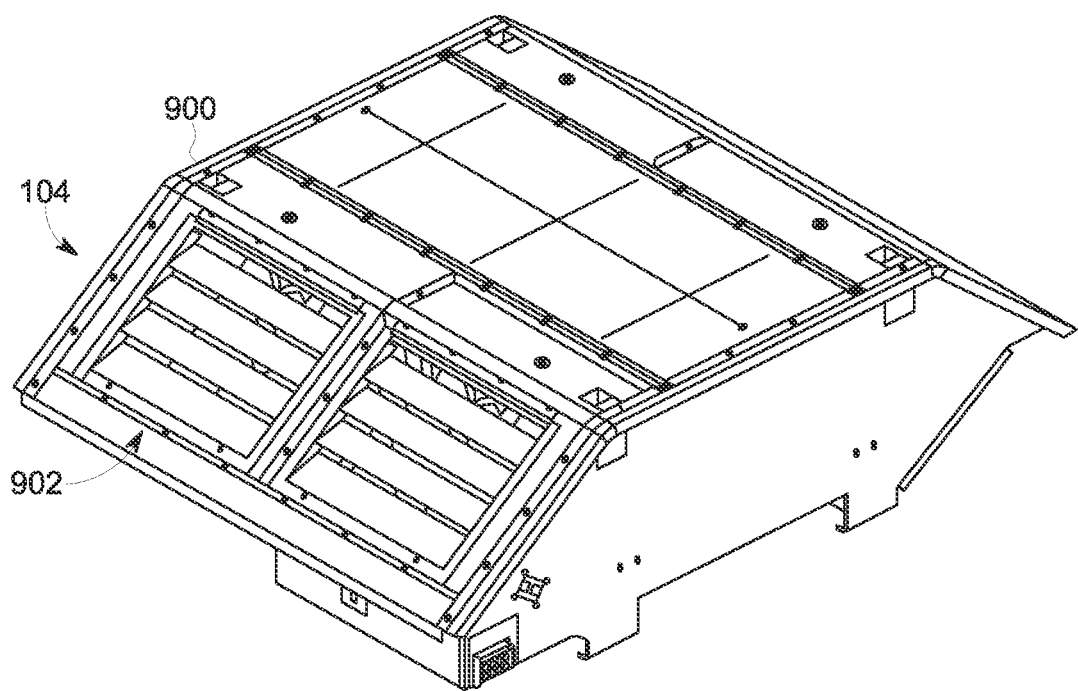
FIG. 9 is a perspective view the ventilation system shown in FIG. 1 that may be included in the powered system also shown in FIG. 1.

FIG. 9 is a perspective view the ventilation system 104 that may be included in the powered system 100 shown in FIG. 1. The ventilation system 104 may be disposed within an exterior housing 900. For example, blowers of the ventilation system 104 can be located inside the housing 900. Inlet ducts 902 may provide access into the ventilation system 104 such that the blowers can draw air from outside of the housing 900 into the housing 900 (and into the ventilation system 104) via the inlet ducts 902. This air may be used to cool the resistive bodies 102, as described herein.

During operation of the powered system 100, the inlet ducts 902 can become blocked, such as being clogged with debris. Debris such as snow, ice, dirt, leaves, or other matter can become lodged in the inlet ducts 902 in such a way that the orifices that are defined by the ducts 902 and through which air is drawn into the powered system 100 is reduced. The powered system 100 can include a monitoring system that autonomously monitors the blowers in order to determine if one or more of the inlet ducts 104 are at least partially blocked.

Figure 2:
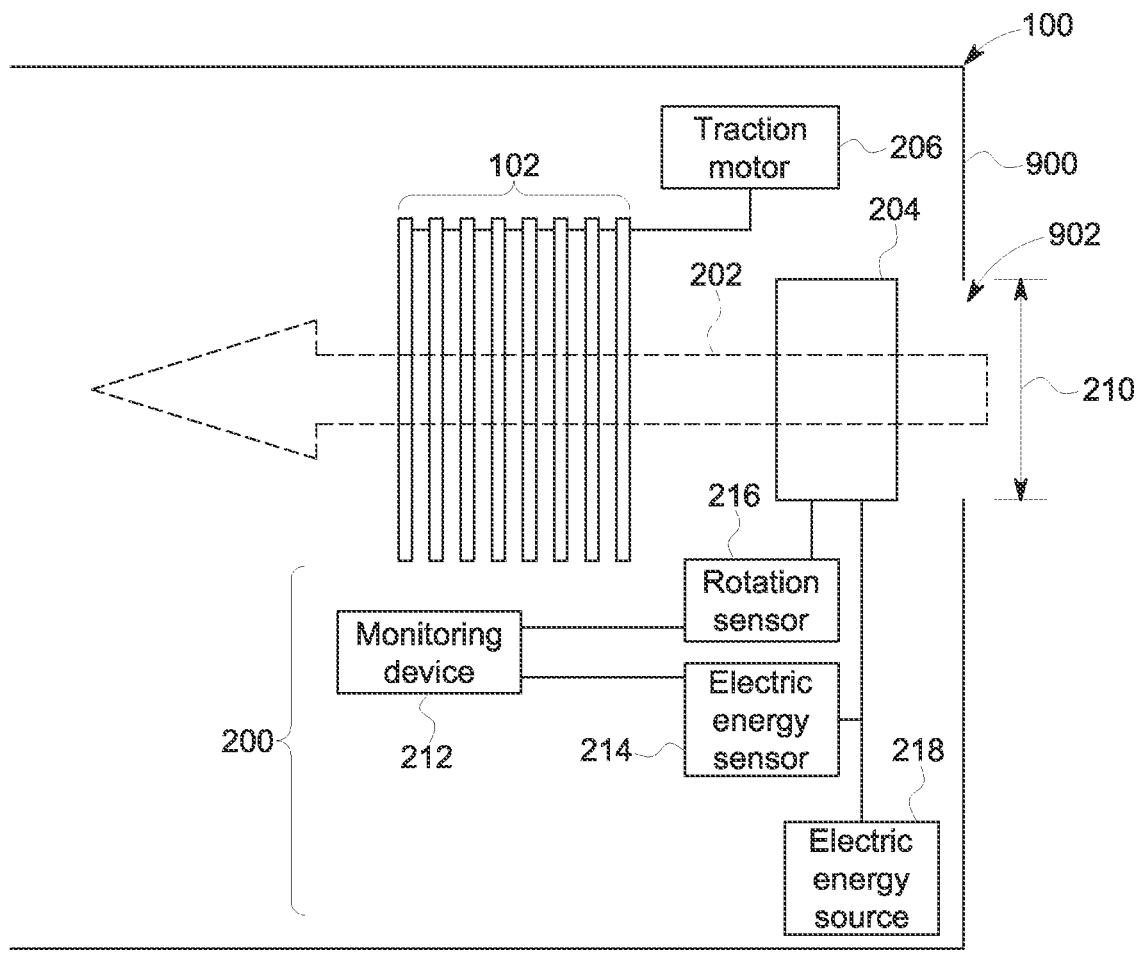
FIG. 2 is a schematic diagram of one embodiment of a monitoring system.

FIG. 2 is a schematic diagram of one embodiment of a monitoring system 200. The monitoring system 200 can be disposed onboard the powered system 100. As described above, the powered system 100 includes one or more inlet ducts 902 through which air 202 is drawn by one or more blowers 204 to cool electrically resistive bodies 102, such as dynamic braking grids. The bodies 102 may be conductively coupled with traction motors 206 of the powered system 100 so that the electric current that is created during braking of the powered system 100 can be conveyed to the bodies 102 and converted into thermal energy (e.g., heat).

In the illustrated embodiment, the inlet duct 902 provides access to the interior of the powered system 100 through the exterior (e.g., exposed) housing 900 of the powered system 100. The inlet duct 902 defines an opening through the housing 900 having a designated size 210 (e.g., diameter). As debris (e.g., snow, dirt, and the like) clogs the inlet duct 902, the cross-sectional surface area of the inlet duct 902 through which the air 202 is drawn into the powered system 100 decreases below the designated size 210.

The monitoring system 200 includes a monitoring device 212 that receives measurements (e.g., data or output signals) from sensors in order to determine if the inlet duct 902 is at least partially blocked (e.g., the size of the inlet duct 902 is effectively decreased below the size 210). In the illustrated embodiment, these sensors include an electric energy sensor 214 and a rotation sensor 216. The monitoring device 212 can represent a processing device, such as a processor, controller, computer, or other logic-based device that operates based on one or more sets of instructions (e.g., software or hard-wired logic) to perform the operations described herein. The monitoring device 212 shown in FIG. 2 can represent the hardware that performs the operations associated with the monitoring device 212, the tangible and non-transitory computer readable medium (e.g., computer memory) that stores the instructions, and/or the instructions.

The electric energy sensor 214 measures an amount of electric energy that is supplied to the blower 204 in order to power the blower 204. The electric energy can be supplied from an electric energy source 218, such as a battery, fuel cell, generator, alternator, or other device that may be located onboard or off-board the powered system 100. The electric energy sensor 214 can be a voltage and/or current sensor that is connected with the source 218 and/or the blower 204 in such a way that the electric energy sensor 214 can measure the voltage and/or current that is supplied to the blower 204. In one embodiment, the electric energy sensor 214 is conductively coupled with a bus, cable, or other conductive pathway through which the current and/or voltage is supplied to the blower 204 from the source 218 in order to power the blower 204. Alternatively, the electric energy sensor 214 may be included in the source 218. For example, the electric energy sensor 214 can represent an output of the electric energy source 218 that represents the current and/or voltage that is demanded by the blower 204 to cause the blower 204 to operate (e.g., rotate blades or turbines) at a manually or autonomously selected speed.

The rotation sensor 216 measures a rotation speed at which the blower 204 operates to draw the air 202 into the powered system 100 and over, through, and/or around the bodies 102. The rotation sensor 216 can measure the speed at which a rotor in an electric motor of the blower 204 rotates to rotate blades or turbines of the blower 204. The rotation sensor 216 can be coupled with the blower 204 or included in the blower 204. For example, the rotation sensor 216 can represent an output of the blower 204 or a motor of the blower 204 that represents the speed at which the blower 204 operates.

The monitoring device 212 receives the measured amount of electric energy that is supplied to the blower 204 (as obtained by the sensor 214) and the rotation speed of the blower 204 (as obtained by the sensor 216). The monitoring device 212 compares the measured rotation speed with a designated speed limit of the blower 204 that is associated with the measured amount of electric energy. As described below, the blower 204 may be associated with a baseline relationship between (a) different amounts of electric energy that is supplied to the blower 204 when the inlet duct 204 is not blocked (e.g., the effective size of the inlet duct 204 is the same as the original size 210 of the inlet duct 902) and (b) resulting rotation speeds of the blower 204. The rotation speeds of the baseline relationship may be correlated to the designated speed limits of the blower 204 that are associated with the different amounts of electric energy that is supplied to the blower 204.

The monitoring device 212 determines if the measured rotation speed for the measured electric energy that is supplied to the blower 204 is faster than the rotation speed of the blower 204 that was measured when the inlet duct 902 was known to be unblocked (e.g., during a previous calibration or set up of the system 200) and when the same electric energy was supplied to the blower 204. If the measured rotation speed of the blower 204 is faster than the speed limit (e.g., the rotation speed at which the blower 204 would be expected to operate when supplied with the measured electric energy and when the inlet duct 902 is free from debris), then the monitoring system 200 may determine that the inlet duct 902 is at least partially blocked with debris. The at least partial blockage of the inlet duct 902 can cause the pressure inside the powered system 100 (or at least in the vicinity of the blower 204) to decrease, which can result in the blower 204 operating at a faster speed than would be expected for the electric energy that is supplied to the blower 204. Therefore, measured rotation speeds that are faster than expected can indicate that the air pressure has dropped and that the inlet duct 902 may be at least partially blocked.

Figure 3:
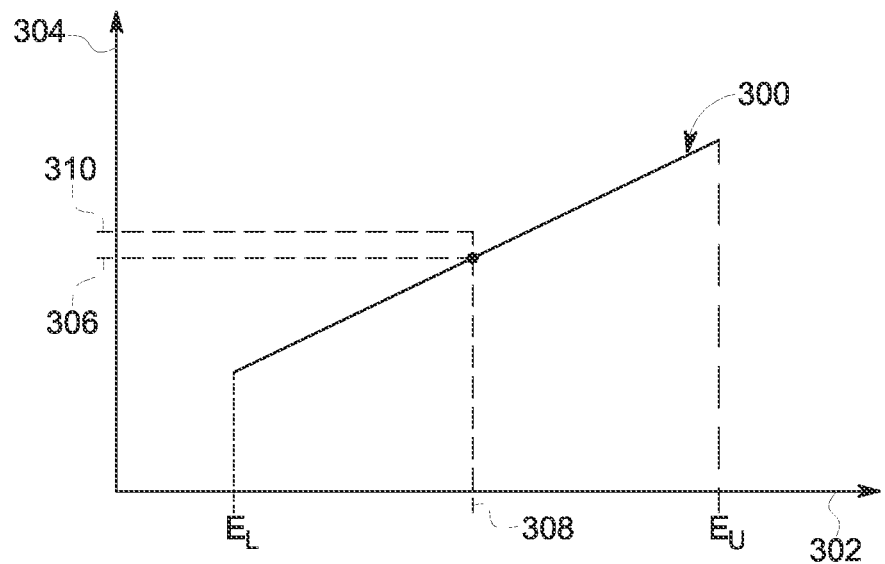
FIG. 3 is one example of a baseline relationship for a blower shown in FIG. 2.

FIG. 3 is one example of a baseline relationship 300 for the blower 204 (shown in FIG. 2). The baseline relationship 300 is shown alongside a horizontal axis 302 representative of electric energy that is supplied to the blower 204 to power the blower 204. The baseline relationship 300 also is shown alongside a vertical axis 304 representative of rotation speeds at which the blower 204 operates. The baseline relationship 300 indicates the rotation speeds at which the blower 204 operates when supplied with the corresponding electric energies and when the inlet duct 902 (shown in FIG. 1) is not blocked, or when the inlet duct 902 is blocked by a known amount (e.g., 10%, 15%, 20%, or the like blocked). The baseline relationship 300 is shown as a linear relationship. Alternatively, the baseline relationship 300 may be a non-linear relationship and/or may include a combination of linear and non-linear relationships. The rotation speeds represented by the baseline relationship 300 can be referred to as designated rotation speed limits associated with the different amounts of electric energy. The baseline relationship(s) may be captured/embodied as data in a data set (such as a set of rotation speed values correlated to supplied electric energy values), as values embodied in specifically selected electronic components, etc.

The baseline relationship 300 can be created by determining the rotation speeds of the blower 204 when various different electric energies are supplied to the blower 204 when the inlet duct 902 is not blocked or when the inlet duct 902 is blocked by a known amount. For example, when the inlet duct 902 is not blocked, several different electric energies can be supplied to the blower 204 and the corresponding rotation speeds can be measured to generate the baseline relationship 300. The monitoring device 212 can create the baseline relationship 300 based on this information. Alternatively, the monitoring device 212 can be provided with the baseline relationship 300 from an outside source, such as the manufacturer or installer of the blower 204.

In operation, the monitoring device 212 obtains measured rotation speeds and measured electric energies supplied to the blower 204 and compares the measured rotation speeds to the speed limits represented by the baseline relationship 300. The monitoring device 212 may compare the rotation speeds that are measured during actual operation of the powered system 100, such as during travel of the vehicle along a route, as opposed to time periods when the powered system 100 is being repaired or not being operated to perform a designated task (e.g., the vehicle is stationary as opposed to moving).

As one example, if the rotation sensor 216 (shown in FIG. 2) measures a first rotation speed 306 of the blower 204 when a first electric energy 308 is supplied to the blower 204 (as measured by the electric energy sensor 214 shown in FIG. 1), then the monitoring device 212 can compare the first rotation speed 306 to the baseline relationship 300 at the same first electric energy 308. As shown in FIG. 3, the first rotation speed 306 does not exceed the speed limit established by the baseline relationship 300 at the first electric energy 308. If the rotation sensor 216 measures a faster, second rotation speed 310 of the blower 204 when the first electric energy 308 is supplied to the blower 204, however, then the monitoring device 212 can determine that the second rotation speed 310 does exceed the baseline relationship 300 at the first electric energy 308. The faster second rotation speed 310 can represent an inlet duct 902 that is at least partially blocked, as described above.

In one embodiment, the monitoring device 212 may not identify the inlet duct 902 as being at least partially blocked unless the measured rotation speeds of the blower 204 exceed the speed limits established by the baseline relationship 300 for the same electric energies supplied to the blower 204 for at least a designated time period. For example, the monitoring device 212 may identify the duct 902 as being at least partially blocked only when the measured rotation speeds remain in excess of the baseline relationship 300 for at least a threshold time period and/or for at least a designated number of measurements. The monitoring device 212 can wait to identify the inlet duct 902 as being at least partially blocked in order to avoid transient increases in the measured rotation speed (which can be caused by wind gusts or other external factors) from being identified as a blocked inlet duct 902.

The monitoring device 212 may only compare the measured rotation speeds of the blower 204 to the baseline relationship 300 when the measured electric energy that is supplied to the blower 204 is within a designated range in one embodiment. For example, the monitoring device 212 may only compare the measured rotation speeds to the baseline relationship 300 when the supplied electric energy is between a lower limit ($E_L$) and an upper limit ($E_U$). The monitoring device 212 can ignore those measured rotation speeds that are obtained when the electric energy supplied to the blower 204 is smaller than the lower limit ($E_L$) or greater than the upper limit ($E_U$). The rotation speeds of the blower 204 may deviate from the baseline relationship 300 even when the inlet duct 902 is free from debris at relatively low voltages and/or currents (e.g., electric energies below the lower limit $E_L$) and/or at relatively high voltages and/or currents (e.g., electric energies above the upper limit $E_U$). Therefore, the monitoring device 212 may only examine the rotation speeds that are measured when the supplied electric energy is within the designated range that extends from the lower limit ($E_L$) to the upper limit ($E_U$).

The baseline relationship 300 for the blower 204 may change over time. For example, due to aging (e.g., wear and tear) of the blower 204, repairs and/or maintenance of the blower 204, and the like, the speeds at which the blower 204 operates when supplied with various electric energies may change over time, even with an unblocked inlet duct 902. The monitoring device 212 (or another off-board source) can update the baseline relationship 300 to reflect changes in the blower 204 that are not indicative of the inlet duct 902 being at least partially blocked.

Figure 4:
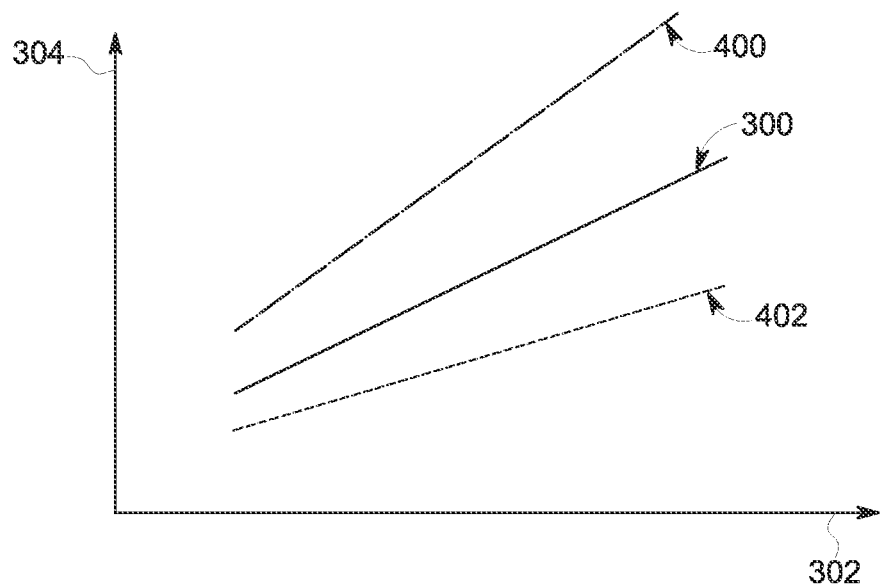
FIG. 4 illustrates examples of updated baseline relationships for the blower shown in FIG. 2.

FIG. 4 illustrates examples of updated baseline relationships 400, 402 for the blower 204 (shown in FIG. 2). The updated baseline relationships 400, 402 are shown alongside the axis 302, 304 described above in connection with FIG. 3. The baseline relationship 300 can be modified to one of the updated baseline relationships 400, 402 by re-calibrating the blower 300. In one embodiment, when the powered system 100 (shown in FIG. 1) is not operating to perform a designated task (e.g., the vehicle is not moving or is in a station being repaired or serviced), the monitoring device 212 (shown in FIG. 2), the monitoring device 212 (or another device) can direct the blower 204 to operate at different supplied electric energies and the monitoring device 212 can obtain the measured rotation speeds at the supplied electric energies. The monitoring device 212 can then update the baseline relationship 300 to the relationship 400 or 402. The updated baseline relationship 400, 402 may then be used by the monitoring device 212 to determine if the inlet duct 902 is at least partially blocked. With respect to the powered system 100 being a vehicle, such as a locomotive, the baseline relationship 300 can be updated by the monitoring device 212 when the vehicle is stationary and/or when the dynamic brakes of the vehicle are applied during travel of the vehicle.

In one embodiment, the powered system 100 may include multiple blowers 204. Due to manufacturing variances, different aging of the blowers 204, different repairs and/or maintenance cycles of the blowers 204, and the like, the baseline relationships of the blowers 204 may differ from each other. The monitoring device 212 can determine or obtain individual baseline relationships for the various blowers 204 that are each customized for a different blower 204.

Figure 5:
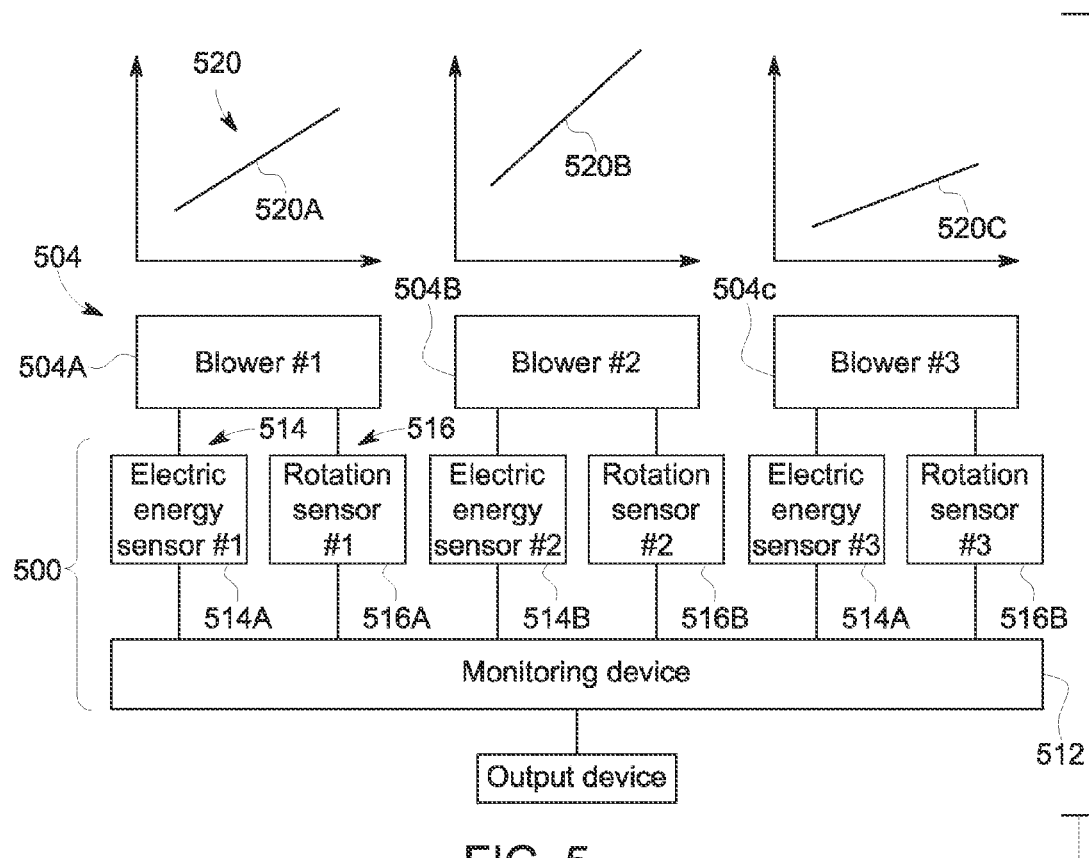
FIG. 5 is a schematic illustration of one example of a monitoring system that includes multiple blowers having different baseline relationships.

FIG. 5 is a schematic illustration of one example of a monitoring system 500 for multiple blowers 504 (e.g., Blower #1 504A, Blower #2 504B, and Blower #3 504C) having different baseline relationships 520 (e.g., baseline relationships 520A-C). The monitoring system 500 can be similar to the system 200 shown in FIG. 2 in that the monitoring system 500 includes a monitoring device 512 (e.g., the monitoring device 212 shown in FIG. 2) that receives measured rotation speeds of the several blowers 504A-C from several rotation sensors 516 (e.g., Rotation Sensor #1 516A, Rotation Sensor #2 516B, and Rotation Sensor #3 516C, which may be similar to the rotation sensor 216 shown in FIG. 2) and that receives measured electric energies that are supplied to the blowers 504A-C. The measured electric energies can be provided by several electric energy sensors 514 (e.g., Electric Energy Sensor #1 514A, Electric Energy Sensor #2 514B, and Electric Energy Sensor #3 514C, which may be similar to the electric energy sensor 214 shown in FIG. 2).

The different blowers 504A-C may be associated with different respective baseline relationships 520A-C. For example, the monitoring device 512 may use the baseline relationship 520A to determine if the measured rotation speeds of the blower 504A indicate that an inlet duct is at least partially blocked. The monitoring device 512 may use the baseline relationship 520B to determine if the measured rotation speeds of the blower 504B indicate that an inlet duct is at least partially blocked, and may use the baseline relationship 520C to determine if the measured rotation speeds of the blower 504C indicate that an inlet duct is at least partially blocked. The baseline relationships 520 may be separately determined for each individual blower 504 and/or differently updated on the same or different schedules over time such that each baseline relationship 520 is individually customized for a particular blower 504.

If the measured rotation speeds of one or more (or at least a designated number) of the blowers 504 indicates that one or more inlet ducts may be at least partially blocked, the monitoring device 512 can transmit an output signal to an output device 518. Although not shown in FIG. 2, the monitoring device 212 also may output such a signal to an output device. The output device 518 represents a device, such as a display screen, speaker, printer, light, or other device, that can notify an operator of the system 100 or a remote monitoring location of the system 100 that one or more inlet ducts may be at least partially blocked. In response to identifying an inlet duct that is at least partially blocked, the monitoring device 512 may direct the operator to power down the system 100 and/or autonomously power down the system 100 so that the bodies 102 (shown in FIG. 1) are not damaged and/or the inlet ducts can be cleaned of the debris.

In one embodiment, a blower 204, 504 may be associated with several different baseline relationships 300, 520. The different baseline relationships 300, 520 may be used to determine if an inlet duct 902 is at least partially blocked and/or to estimate how much of the inlet duct 902 is blocked, as described below.

Figure 6:
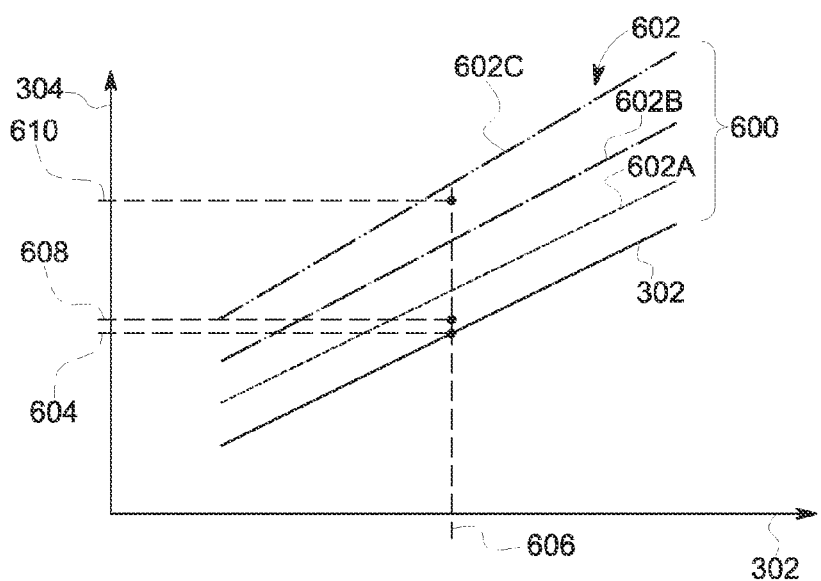
FIG. 6 is one example of a set of baseline relationships for a blower.

FIG. 6 is one example of a set 600 of baseline relationships 300, 602 (e.g., baseline relationships 602A-C) for a blower 204, 504 (shown in FIGS. 2 and 5). The baseline relationships 300, 602 are shown alongside the horizontal axis 302 and the vertical axis 304 described above. The baseline relationships 300, 602 can represent different degrees to which the inlet duct 902 (shown in FIG. 1) is blocked. For example, the baseline relationship 300 can represent the relationship between rotation speed and supplied electric energy for the blower 204, 504 (shown in FIGS. 2 and 5) when the inlet duct 902 is not blocked. The baseline relationship 602A can represent the relationship between rotation speed and supplied electric energy for the same blower 204, 504 when the inlet duct 902 is blocked at a first designated amount (e.g., 25%, although another value may be used). For example, one quarter of the size 210 (shown in FIG. 2) of the inlet duct 902 may be blocked from permitting air 202 to flow through the inlet duct 902. Similarly, the baseline relationships 602B, 602C can represent relationships between rotation speeds and supplied electric energies for the same blower 204, 504 when the inlet duct 902 is blocked at respective second and third designated amounts (e.g., 50% and 75%, although other values may be used). Although four baseline relationships 302, 602 are in the set 600, a smaller or larger number of baseline relationships 302, 602 may be used. The baseline relationships 602 can be obtained by intentionally blocking different amounts of the inlet duct 902 and measuring the resulting effects on the relationship between rotation speeds and supplied electric energies for the blower 204, 504.

In operation, the monitoring device 212, 512 (shown in FIGS. 2 and 5) can obtain measured rotation speeds of the blower 204, 504 when corresponding measured electric energies are supplied to the blower 204, 504. The monitoring device 212, 512 compares the measured rotation speed to the set 600 of baseline relationships 302, 602 to determine if the inlet duct 902 is at least partially blocked and, if so, to estimate how much of the inlet duct 902 is blocked. For example, if the monitoring device 212, 512 receives a first measured rotation speed 604 and compares the measured rotation speed 604 to the set 600 of baseline relationships 302, 602, the monitoring device 212, 512 may determine that the inlet duct 902 is not blocked. As shown in FIG. 6, the first measured rotation speed 604 does not exceed the baseline relationship 302 that is associated with an unblocked inlet duct 902 for a corresponding first electric energy 606.

If, however, the monitoring device 212, 512 receives a faster, second measured rotation speed 608 and compares the second measured rotation speed 608 to the set 600 of baseline relationships 302, 602, the monitoring device 212, 512 may determine that the inlet duct 902 is at least partially blocked, but less than 25% (or other value) blocked. As shown in FIG. 6, the second measured rotation speed 608 exceeds the baseline relationship 302 that is associated with an unblocked inlet duct 902 for the electric energy 606, but does not exceed the baseline relationship 602A that is associated with the inlet duct 902 being 25% blocked (or another value).

As another example, if the monitoring device 212, 512 receives a faster, third measured rotation speed 610 for the measured electric energy 606 and compares the third measured rotation speed 610 to the set 600 of baseline relationships 302, 602, the monitoring device 212, 512 may determine that the inlet duct 902 is between 50 and 75% (or other values) blocked. As shown in FIG. 6, the third measured rotation speed 610 exceeds the baseline relationship 602B that is associated with an inlet duct 902 being 50% blocked for the electric energy 606, but does not exceed the baseline relationship 602C that is associated with the inlet duct 902 being 75% blocked (or another value). As described above, the monitoring device 212, 512 can obtain several measurements of the rotation speeds before determining whether and/or to what degree the inlet duct 902 is blocked to avoid transient changes in the rotation speeds providing a false identification of the inlet duct 902 being partially blocked and/or a false estimation of how blocked the inlet duct 902 actually is.

If the inlet duct is identified as being blocked (e.g., by at least a threshold amount), then one or more responsive actions can be taken. For example, in response to determining that the inlet duct is at least partially blocked based on the electric energy and the rotation speed that are measured, one or more sub-systems of the vehicle can be controlled. These sub-systems can include a propulsion subsystem that includes one or more engines, traction motors, alternators, generators, and the like, that are used to propel the vehicle. Such a sub-system can be controlled responsive to the determination that the inlet duct is at least partially blocked by slowing down movement of the vehicle. Another sub-system can include a braking subsystem that engages brakes to slow down movement of the vehicle responsive to the determination that the inlet duct is at least partially blocked. Additionally or alternatively, the braking subsystem can restrict the use of brakes that rely on the inlet duct to cool the brakes (e.g., a dynamic braking system that uses grids that are cooled by the air drawn through the inlet duct). For example, responsive to the determination that the inlet duct is at least partially blocked, the braking subsystem may prevent use of the dynamic braking system and only allow use of the air brakes of the vehicle to stop movement of the vehicle.

Figure 7:
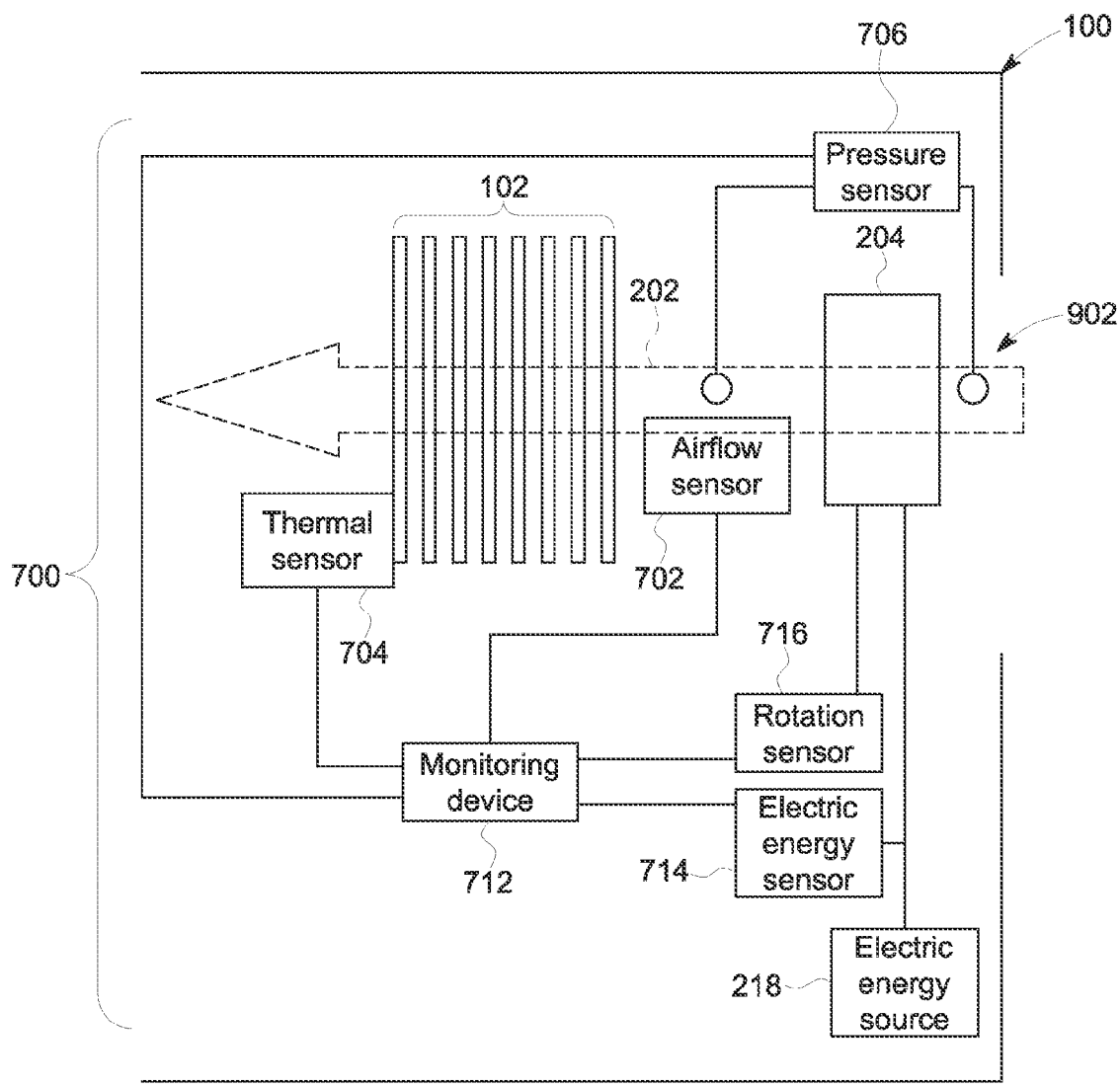
FIG. 7 is a schematic diagram of another embodiment of a monitoring system.

FIG. 7 is a schematic diagram of another embodiment of a monitoring system 700. The monitoring system 700 can be similar to the monitoring system 200 shown in FIG. 2 in that the monitoring system 700 may include a monitoring device 712 (e.g., the monitoring device 212 shown in FIG. 2), an electric energy sensor 714 (e.g., the electric energy sensor 214 shown in FIG. 2), and a rotation sensor 716 (e.g., the rotation sensor 216 shown in FIG. 2). Similar to the monitoring system 200, the monitoring device 712 can examine measured rotation speeds and electric energies supplied to the blower 204, compare the rotation speeds to one or more baseline relationships associated with the blower 204, and determine if the inlet duct 902 is at least partially blocked, as described above.

One difference between the monitoring system 200 and the monitoring system 700 is that the monitoring system 700 can include a sensor array that includes the sensors 712, 714, as well as one or more additional sensors used to determine if the inlet duct 902 is at least partially blocked. The sensors 712, 714 and one or more of the additional sensors can be used to provide additional data to the monitoring device 712 so that the device 712 can confirm or refute an identification of a partially blocked inlet duct 902 by one or more of the sensors.

For example, the one or more additional sensors may comprise an airflow sensor 702 that may be communicatively coupled (e.g., by one or more wired and/or wireless communication pathways) with the monitoring device 712. The airflow sensor 702 can measure a flow of the air 202 that is moved by the blower 204. For example, the airflow sensor 702 can measure the speed at which the air 202 is drawn and/or pushed by the blower 204 toward the bodies 102. The monitoring device 712 can obtain the measured airflows from the airflow sensor 702 in order to confirm or refute a determination that the inlet duct 902 is at least partially blocked based on the measured rotation speeds of the blower 204. For example, if the measured rotation speed exceeds the designated speed limit obtained from the baseline relationship of the blower 204 for the measured electric energy and the airflow measurement indicates a decrease in the flow of air 202 below a designated airflow, then the monitoring device 712 may determine that the inlet duct 902 is at least partially blocked. If the measured rotation speed exceeds the designated speed limit obtained from the baseline relationship of the blower 204 but the airflow measurement does not indicate a decrease in the flow of air 202 below the designated airflow, then the monitoring device 712 may not determine that the inlet duct 902 is at least partially blocked. The designated airflow to which the measured airflow is determined may be an airflow that was previously measured by the airflow sensor 702 for the same electric energy supplied to the blower 204 (as for the measured rotation speed) when the inlet duct 902 is unblocked. Although the airflow sensor 702 is disposed downstream of the blower 204 along the direction of the movement of the air 202 in FIG. 2, the airflow sensor 702 may be disposed upstream of the blower 204 and/or multiple airflow sensors 702 may be disposed on opposite sides of the blower 204 to obtain multiple airflow measurements.

A thermal sensor 704 may be communicatively coupled with the monitoring device 712 and can measure a temperature of the bodies 102 over which the air 202 is moved by the blower 204. The monitoring device 712 can obtain the measured temperatures of the bodies 102 from the thermal sensor 704 in order to confirm or refute a determination that the inlet duct 902 is at least partially blocked based on the measured rotation speeds of the blower 204. For example, if the measured rotation speed exceeds the designated speed limit obtained from the baseline relationship of the blower 204 for the measured electric energy and the temperature measurement indicates an increase in the temperature of the one or more bodies 102 above a designated temperature, then the monitoring device 712 may determine that the inlet duct 902 is at least partially blocked. If the measured rotation speed exceeds the designated speed limit obtained from the baseline relationship of the blower 204 but the temperature measurement does not indicate an increase in the temperature above the designated temperature, then the monitoring device 712 may either determine that the inlet duct 902 is not at least partially blocked or that any blockage of the inlet duct 902 is insufficient to prevent the blower 204 from cooling the bodies 102.

A pressure sensor 706 may be communicatively coupled with the monitoring device 712 and can measure an air pressure upstream and/or downstream of the blower 204. The monitoring device 712 can obtain the measured pressures of the volume disposed upstream and/or downstream from the blower 204 in order to confirm or refute a determination that the inlet duct 902 is at least partially blocked based on the measured rotation speeds of the blower 204. For example, if the measured rotation speed exceeds the designated speed limit obtained from the baseline relationship of the blower 204 for the measured electric energy and the measured pressure is less than a designated air pressure, then the monitoring device 712 may determine that the inlet duct 902 is at least partially blocked. If the measured rotation speed exceeds the designated speed limit obtained from the baseline relationship of the blower 204 but the pressure measurement does not indicate a decrease in the pressure, then the monitoring device 712 may either determine that the inlet duct 902 is not at least partially blocked.

Other types of sensors also may be used. For example, a visual sensor, such as a camera, laser sensitive sensor, or other device that visually inspects the inlet duct, may be used to confirm or refute the identification of a blocked inlet duct. As another example, voltage and/or current sensors may measure changes in the electric resistance of the bodies 102. These changes may confirm or refute an identification of a blocked inlet duct. For example, the resistance of dynamic braking grids may decrease when the grids become hot due to decreased airflow through the inlet duct.

In one embodiment, the measurements obtained by the rotation sensors 216, 516, 716, the airflow sensor 702, and/or the pressure sensor 706 may be adjusted due to an ambient air pressure and/or temperature. For example, in locations where the ambient air pressure and/or the ambient temperature is lower, the blower 204 may operate at a faster speed for a supplied electric energy than when the blower 204 operates in a location where the ambient pressure and/or temperature is greater (for the same supplied electric energy). The monitoring device 712 can modify or correct the measured rotation speeds and/or the baseline relationship of the blower 204 to account for changes in ambient pressure and/or temperature.

Figure 8:
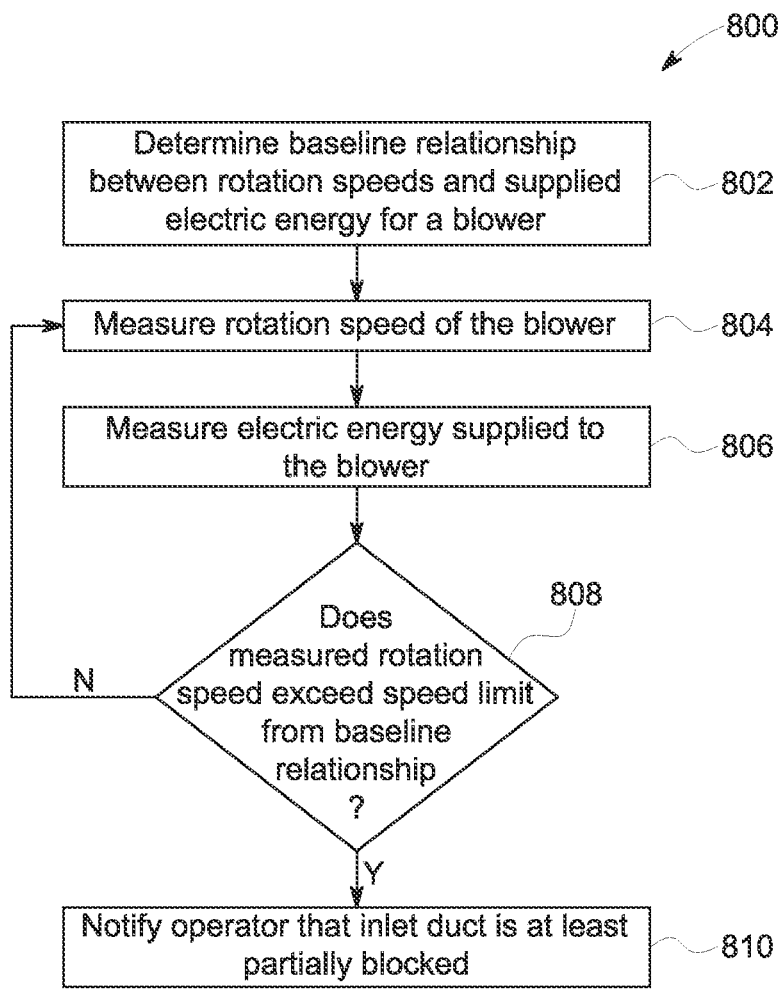
FIG. 8 is a flowchart of one example of a method for monitoring a blower to determine if an inlet duct of a powered system is at least partially blocked.

FIG. 8 is a flowchart of one example of a method 800 for monitoring a blower to determine if an inlet duct of a powered system is at least partially blocked. The method 800 can be used in conjunction with one or more of the monitoring systems described herein to determine if an inlet duct of a powered system is at least partially blocked.

At 802, a baseline relationship for the blower is determined. As described above, the baseline relationship can represent how the rotation speeds of the blower change when the inlet duct through which the blower draws air is unblocked and different amounts of electric energy is supplied to the blower. The baseline relationship can be updated (e.g., re-calibrated) over time to account for changes in the blower due to repair, maintenance, aging, and the like.

At 804, during operation of the powered system, rotation speeds at which the blower is operating are measured (e.g., measured autonomously by a monitoring system). The rotation speeds may be periodically measured on a regular basis, upon demand by an operator of the powered system, or based on some other schedule.

At 806, the electric energies that are supplied to the blower when the rotation speeds are measured also are measured (e.g., measured autonomously by a monitoring system). For example, the electric energy that is supplied to power the blower to cause the blower to operate at a measured rotational speed is obtained.

At 808, the measured rotation speed is compared to a designated speed limit obtained from the baseline relationship and associated with the measured electric energy (e.g., compared autonomously by a monitoring system). For example, the measured rotational speed can be compared to the rotational speed in the baseline relationship that is associated with the measured electric energy. If the measured rotational speed exceeds the rotational speed of the baseline relationship, then the measured rotational speed may indicate that the blower is operating at a faster speed that would be expected if the inlet duct is unblocked. As a result, flow of the method 800 can continue to 810. If the measured rotational speed does not exceed the rotational speed of the baseline relationship, then the measured rotational speed may indicate that the blower is operating at a speed that would be expected if the inlet duct is unblocked. As a result, the inlet duct may not be blocked and flow of the method 800 can return to 804. As described above, several measurements of the rotation speed and the electric energy may be examined in order to ensure that a measurement that indicates a blocked inlet duct is not merely a transient measurement.

In one embodiment, one or more additional measurements can be obtained of the blower to confirm or refute a potential identification of an inlet duct that is at least partially blocked. For example, the airflow around the blower can be measured, the temperature of the objects being cooled by the blower can be measured, the air pressure around the blower can be measured, and the like. These measurements may also indicate whether the blower is operating in a manner that indicates that the inlet duct is at least partially blocked, as described above. Based on these additional measurements, the inlet duct may be identified as being at least partially blocked (in which case the method 800 proceeds to 810) or at being unblocked (in which case the method 800 returns to 804).

At 810, a notification is sent (e.g., sent autonomously by a monitoring system) to an operator of the powered system to instruct the operator that the inlet duct may be at least partially blocked. For example, a display, speaker, light, or other device can present information (e.g., text, images, light, sounds, and the like) to warn the operator of the potentially blocked inlet duct. The operator may then take appropriate action, such as stopping continued operation of the powered system. Additionally or alternatively, the powered system may autonomously stop operation. In other embodiments, a monitoring system autonomously controls the powered system (vehicle or otherwise) based on determining that the inlet duct may be at least partially blocked. For example, the monitoring system may be configured to stop operation of the powered system or portion thereof (e.g., halt operation of the powered system entirely, or halt operation of the resistive grids and dynamic braking function), or to activate a sub-system for attempting to unblock the inlet duct. Examples of the latter include: activating a sub-system associated with the inlet duct that is configured, when activated, to mechanically interact with the inlet duct for attempting to dislodge debris (e.g., a movable wiper or brush sub-system that, when activated, moves over an external surface of a mesh screen at an entrance to the inlet duct); activating an electric heater positioned at the inlet duct for melting ice or snow; or temporarily halting operation of the resistive grids and dynamic braking system followed by reversing the direction of operation of the blower, such that air is blown out through the inlet duct instead of drawn in through the inlet duct, with the air blown out through the inlet duct serving to dislodge debris. Reverse blower speed and associated electric energy supplied to the blower in reverse may be monitored for determining that debris has been dislodged; alternatively or additionally, a period of reverse operation may be followed by a period of normal operation and subsequent reassessment of whether the inlet duct is still at least partially blocked.

In one embodiment, a system (e.g., a monitoring system for a powered system) includes an electric energy sensor, a rotation sensor, and a monitoring device. The electric energy sensor is configured to be coupled with a blower to measure a first amount of electric energy that is supplied to the blower to power the blower. When the blower is powered, the blower is configured to draw air through an inlet duct and over one or more bodies to cool the bodies. The rotation sensor is configured to be coupled with the blower to measure a first rotation speed at which the blower operates to draw the air through the inlet duct and over the one or more bodies when the blower is powered with the first amount of electric energy. The monitoring device is configured to compare the first rotation speed of the blower with a designated speed limit that is associated with the first amount of electric energy to determine if the inlet duct is at least partially blocked. The monitoring device is configured to identify the inlet duct as being at least partially blocked when the first rotation speed exceeds the designated speed limit.

In one aspect, the blower is included in a vehicle and the bodies that are cooled by the air drawn through the inlet duct by the blower comprise electrically resistive braking grids of the vehicle.

In one aspect, the monitoring device is configured to obtain the designated speed limit from (based on) a baseline relationship between different rotational speeds at which the blower operates when supplied with corresponding different amounts of electric energy.

In one aspect, the baseline relationship represents the different rotation speeds of the blower that are measured at the different respective amount of electric energy when the blower operates to draw the air through the inlet duct and the inlet duct is unblocked.

In one aspect, the baseline relationship is individually customized for the blower.

In one aspect, the monitoring device is configured to modify the baseline relationship by measuring one or more additional rotation speeds of the blower at one or more additional amounts of electric energy during operation of the blower and updating the baseline relationship based on the one or more additional rotation speeds.

In one aspect, the blower is included in a vehicle to cool dynamic braking grids of the vehicle and the monitoring device is configured to modify the baseline relationship by measuring the one or more additional rotation speeds only when the vehicle is stationary or dynamic brakes of the vehicle are applied.

In one aspect, the monitoring device is configured to receive an airflow measurement from an airflow sensor that is positioned to measure flow of the air that is moved by the blower. The monitoring device also is configured to identify the inlet duct as being at least partially blocked when the first rotation speed exceeds the designated speed limit and the airflow measurement indicates a decrease in the flow of air below a designated flow of air.

In one aspect, the monitoring device is configured to receive a temperature measurement from a thermal sensor that is positioned to measure a temperature of the one or more bodies. The monitoring device also is configured to identify the inlet duct as being at least partially blocked when the first rotation speed exceeds the designated speed limit and the temperature measurement indicates an increase in the temperature of the one or more bodies above a designated temperature.

In one aspect, the monitoring device is configured to receive a pressure measurement from a pressure sensor that is positioned to measure an air pressure at least one of upstream or downstream from the blower. The monitoring device also is configured to identify the inlet duct as being at least partially blocked when the first rotation speed exceeds the designated speed limit and the pressure measurement indicates a decrease in the air pressure below a designated pressure.

In one aspect, the electric energy sensor is at least one of a voltage sensor configured to measure a voltage supplied to the blower as the first amount of electric energy or a current sensor configured to measure a current supplied to the blower as the first amount of electric energy.

In one embodiment, a method (e.g., for monitoring a blower in a powered system) includes measuring a first amount of electric energy that is supplied to the blower to power the blower. The blower is powered to draw air through an inlet duct and over one or more bodies to cool the bodies. The method also includes measuring a first rotation speed at which the blower operates to draw the air through the inlet duct and over the one or more bodies when the blower is powered with the first amount of electric energy, comparing the first rotation speed of the blower with a designated speed limit that is associated with the first amount of electric energy to determine if the inlet duct is at least partially blocked, and identifying the inlet duct as being at least partially blocked when the first rotation speed exceeds the designated speed limit.

In one aspect, the blower is included in a vehicle and the one or more bodies that are cooled by the air drawn through the inlet duct by the blower comprise electrically resistive braking grids of the vehicle.

In one aspect, the method also includes obtaining the designated speed limit from (based on) a baseline relationship between different rotational speeds at which the blower operates when supplied with corresponding different amounts of electric energy.

In one aspect, the baseline relationship represents the different rotation speeds of the blower that are measured at the different respective amount of electric energy when the blower operates to draw the air through the inlet duct and the inlet duct is unblocked.

In one aspect, the baseline relationship is individually customized for the blower.

In one aspect, the method also includes modifying the baseline relationship by measuring one or more additional rotation speeds of the blower at one or more additional amounts of electric energy during operation of the blower and updating the baseline relationship based on the one or more additional rotation speeds.

In one aspect, the blower is included in a vehicle to cool dynamic braking grids of the vehicle and modifying the baseline relationship by measuring the one or more additional rotation speeds occurs only when the vehicle is stationary or dynamic brakes of the vehicle are applied.

In one aspect, the method also includes receiving an airflow measurement representative of a flow of the air that is moved by the blower. The inlet duct is identified as being at least partially blocked when the first rotation speed exceeds the designated speed limit and the airflow measurement indicates a decrease in the flow of air below a designated flow of air.

In one aspect, the method also includes receiving a temperature measurement of the one or more bodies. The inlet duct is identified as being at least partially blocked when the first rotation speed exceeds the designated speed limit and the temperature measurement indicates an increase in the temperature of the one or more bodies above a designated temperature.

In one aspect, the method also includes receiving a pressure measurement representative of an air pressure at least one of upstream or downstream from the blower. The inlet duct is identified as being at least partially blocked when the first rotation speed exceeds the designated speed limit and the pressure measurement indicates a decrease in the air pressure below a designated pressure.

In one embodiment, a system (e.g., a monitoring system of a powered system) includes plural electric energy sensors, plural rotation sensors, and a monitoring device. The electric energy sensors are configured to measure first electric energies supplied to different blowers in a vehicle to power the blowers so that the blowers draw air into the vehicle through one or more inlet ducts to cool resistive grids of the vehicle. The rotation sensors are configured to measure first rotation speeds at which the blowers operate to draw the air into the vehicle through the one or more inlet ducts when the blowers are supplied with the respective first electric energies. The monitoring device is configured to compare the first rotation speeds of the blowers with respective designated speed limits that are associated with the respective first amounts of electric energy to determine if the one or more inlet ducts are at least partially blocked. The designated speed limits differ for at least two or more of the blowers. The monitoring device is configured to identify the one or more inlet duct as being at least partially blocked when one or more of the first rotation speeds exceed one or more of the respective designated speed limits associated with the blowers.

In one aspect, the monitoring device is configured to obtain the designated speed limits from (based on) plural different baseline relationships between rotational speeds at which the blowers operate when supplied with corresponding different amounts of electric energy and when the one or more inlet ducts are unblocked. The different baseline relationships are associated with the respective blowers.

In one aspect, the different baseline relationships are individually customized for the respective blowers.

In one aspect, the monitoring device is configured to modify at least one of the baseline relationships by measuring one or more additional rotation speeds of one or more of the respective blowers at one or more additional amounts of electric energy during operation of the one or more blowers and updating the baseline relationship based on the one or more additional rotation speeds.

In another embodiment, a method comprises measuring electric energy that is supplied to a blower to power the blower. The blower is powered to draw air through an inlet duct and over one or more bodies to cool the bodies. The blower, inlet duct, and one or more bodies are associated with a powered system. The method further comprises measuring a rotation speed at which the blower operates to draw the air through the inlet duct and over the one or more bodies when the blower is powered with the electric energy. The method further comprises determining if the inlet duct is at least partially blocked based on the electric energy and the rotation speed that are measured. The method further comprises, responsive to a determination that the inlet duct is at least partially blocked, controlling a sub-system of the powered system (e.g., the sub-system is controlled to account for the at least partial blockage).

In another embodiment, a method comprises measuring electric energy that is supplied to a blower to power the blower. The blower is powered to draw air through an inlet duct and over one or more resistive grids to cool the resistive grids. The blower, inlet duct, and one or more resistive grids are associated with a vehicle (e.g., the resistive grids may be dynamic braking resistive grids). The method further comprises measuring a rotation speed at which the blower operates to draw the air through the inlet duct and over the one or more resistive grids when the blower is powered with the electric energy. The method further comprises determining if the inlet duct is at least partially blocked based on the electric energy and the rotation speed that are measured. The method further comprises, responsive to a determination that the inlet duct is at least partially blocked, controlling a sub-system of the vehicle.

In one embodiment, a computer readable storage medium for a system (e.g., a monitoring system) that includes a processor is provided. The computer readable storage medium includes one or more sets of instructions that direct the processor to measure a first amount of electric energy that is supplied to a blower of the system to power the blower. The blower is powered to draw air through an inlet duct and over one or more bodies to cool the bodies. The one or more sets of instructions also are configured to direct the processor to measure a first rotation speed at which the blower operates to draw the air through the inlet duct and over the one or more bodies when the blower is powered with the first amount of electric energy, compare the first rotation speed of the blower with a designated speed limit that is associated with the first amount of electric energy to determine if the inlet duct is at least partially blocked, and identify the inlet duct as being at least partially blocked when the first rotation speed exceeds the designated speed limit.

In one aspect, the one or more sets of instructions are provided as a software update to an existing computer software application or system operating on the system.

In one aspect, the computer readable storage medium is a tangible and non-transitory computer readable storage medium.

In one aspect, the blower is included in a vehicle, and wherein the one or more bodies that are cooled by the air drawn through the inlet duct by the blower comprise resistive braking grids of the vehicle.

In one aspect, the one or more sets of instructions are configured to direct the processor to obtain the designated speed limit based on a baseline relationship between different rotational speeds at which the blower operates when supplied with corresponding different amounts of electric energy.

In one aspect, the baseline relationship represents the different rotation speeds of the blower that are measured at the different respective amounts of electric energy when the blower operates to draw the air through the inlet duct and the inlet duct is unblocked.

In one aspect, the baseline relationship is individually customized for the blower.

In one aspect, the one or more sets of instructions direct the processor to modify the baseline relationship by measuring one or more additional rotation speeds of the blower at one or more additional amounts of electric energy during operation of the blower and updating the baseline relationship based on the one or more additional rotation speeds.

In one aspect, the blower is included in a vehicle to cool dynamic braking grids of the vehicle and the one or more sets of instructions are configured to direct the processor to modify the baseline relationship by measuring the one or more additional rotation speeds occurs only when the vehicle is stationary or dynamic brakes of the vehicle are applied.

In one aspect, the one or more sets of instructions also are configured to direct the processor to receive an airflow measurement representative of a flow of the air that is moved by the blower and identify the inlet duct as being at least partially blocked when the first rotation speed exceeds the designated speed limit and the airflow measurement indicates a decrease in the flow of air below a designated flow of air.

In one aspect, the one or more sets of instructions are configured to direct the processor to receive a temperature measurement of the one or more bodies and to identify the inlet duct as being at least partially blocked when the first rotation speed exceeds the designated speed limit and the temperature measurement indicates an increase in the temperature of the one or more bodies above a designated temperature.

In one aspect, the one or more sets of instructions are configured to direct the processor to receive a pressure measurement representative of an air pressure at least one of upstream or downstream from the blower and to identify the inlet duct as being at least partially blocked when the first rotation speed exceeds the designated speed limit and the pressure measurement indicates a decrease in the air pressure below a designated pressure.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

The invention claimed is:

1. A system comprising:
an electric energy sensor configured to be coupled with a blower to measure a first amount of electric energy that is supplied to the blower to power the blower, wherein the blower is included in a vehicle to cool dynamic braking grids of the vehicle, and wherein when the blower is powered the blower is configured to draw air through an inlet duct and over one or more bodies to cool the bodies;
a rotation sensor configured to be coupled with the blower to measure a first rotation speed at which the blower operates to draw the air through the inlet duct and over the one or more bodies when the blower is powered with the first amount of electric energy; and
a monitoring device configured to compare the first rotation speed of the blower with a designated speed limit that is associated with the first amount of electric energy to determine if the inlet duct is at least partially blocked, wherein the monitoring device is configured to identify the inlet duct as being at least partially blocked when the first rotation speed exceeds the designated speed limit, wherein the monitoring device is configured to obtain the designated speed limit based on a baseline relationship between different rotational speeds at which the blower operates when supplied with corresponding different amounts of electric energy, wherein the monitoring device is configured to modify the baseline relationship by measuring one or more additional rotation speeds of the blower at one or more additional amounts of electric energy during operation of the blower and updating the baseline relationship based on the one or more additional rotation speeds, and wherein the monitoring device is configured to modify the baseline relationship by measuring the one or more additional rotation speeds only when the vehicle is stationary or dynamic brakes of the vehicle are applied.

2. The system of claim 1, wherein the baseline relationship represents the different rotation speeds of the blower that are measured at the different respective amounts of electric energy when the blower operates to draw the air through the inlet duct and the inlet duct is unblocked.

3. The system of claim 1, wherein the baseline relationship is individually customized for the blower.

4. The system of claim 1, wherein the monitoring device is configured to receive an airflow measurement from an airflow sensor that is positioned to measure flow of the air that is moved by the blower, the monitoring device configured to identify the inlet duct as being at least partially blocked when the first rotation speed exceeds the designated speed limit and the airflow measurement indicates a decrease in the flow of air below a designated flow of air.

5. The system of claim 1, wherein the monitoring device is configured to receive a temperature measurement from a thermal sensor that is positioned to measure a temperature of the one or more bodies, the monitoring device configured to identify the inlet duct as being at least partially blocked when the first rotation speed exceeds the designated speed limit and the temperature measurement indicates an increase in the temperature of the one or more bodies above a designated temperature.

6. The system of claim 1, wherein the monitoring device is configured to receive a pressure measurement from a pressure sensor that is positioned to measure an air pressure at least one of upstream or downstream from the blower, the monitoring device configured to identify the inlet duct as being at least partially blocked when the first rotation speed exceeds the designated speed limit and the pressure measurement indicates a decrease in the air pressure below a designated pressure.

7. The system of claim 1, wherein the electric energy sensor is at least one of a voltage sensor configured to measure a voltage supplied to the blower as the first amount of electric energy or a current sensor configured to measure a current supplied to the blower as the first amount of electric energy.

8. A method comprising:
measuring a first amount of electric energy that is supplied to a blower to power the blower, wherein the blower is included in a vehicle to cool dynamic braking grids of the vehicle, the blower powered to draw air through an inlet duct and over one or more bodies to cool the bodies;
measuring a first rotation speed at which the blower operates to draw the air through the inlet duct and over the one or more bodies when the blower is powered with the first amount of electric energy;
comparing the first rotation speed of the blower with a designated speed limit that is associated with the first amount of electric energy to determine if the inlet duct is at least partially blocked;
obtaining the designated speed limit based on a baseline relationship between different rotational speeds at which the blower operates when supplied with corresponding different amounts of electric energy;
modifying the baseline relationship by measuring one or more additional rotation speeds of the blower at one or more additional amounts of electric energy during operation of the blower and updating the baseline relationship based on the one or more additional rotation speeds;
modifying the baseline relationship by measuring the one or more additional rotation speeds only when the vehicle is stationary or dynamic brakes of the vehicle are applied; and
identifying the inlet duct as being at least partially blocked when the first rotation speed exceeds the designated speed limit.

9. The method of claim 8, wherein the baseline relationship represents the different rotation speeds of the blower that are measured at the different respective amounts of electric energy when the blower operates to draw the air through the inlet duct and the inlet duct is unblocked.

10. The method of claim 8, wherein the baseline relationship is individually customized for the blower.

11. The method of claim 8, further comprising receiving an airflow measurement representative of a flow of the air that is moved by the blower, and wherein the inlet duct is identified as being at least partially blocked when the first rotation speed exceeds the designated speed limit and the airflow measurement indicates a decrease in the flow of air below a designated flow of air.

12. The method of claim 8, further comprising receiving a temperature measurement of the one or more bodies, and wherein the inlet duct is identified as being at least partially blocked when the first rotation speed exceeds the designated speed limit and the temperature measurement indicates an increase in the temperature of the one or more bodies above a designated temperature.

13. The method of claim 8, further comprising receiving a pressure measurement representative of an air pressure at least one of upstream or downstream from the blower, and wherein the inlet duct is identified as being at least partially blocked when the first rotation speed exceeds the designated speed limit and the pressure measurement indicates a decrease in the air pressure below a designated pressure.

14. A system comprising:
plural electric energy sensors configured to measure first electric energies supplied to different blowers in a vehicle to power the blowers so that the blowers draw air into the vehicle through one or more inlet ducts to cool resistive grids of the vehicle, wherein the different blowers are included in the vehicle to cool dynamic braking grids of the vehicle;
plural rotation sensors configured to measure first rotation speeds at which the blowers operate to draw the air into the vehicle through the one or more inlet ducts when the blowers are supplied with the respective first electric energies; and
a monitoring device configured to compare the first rotation speeds of the blowers with respective designated speed limits that are associated with the respective first amounts of electric energy to determine if the one or more inlet ducts are at least partially blocked, the designated speed limits differing for at least two or more of the blowers, wherein the monitoring device is configured to identify the one or more inlet duct as being at least partially blocked when one or more of the first rotation speeds exceed one or more of the respective designated speed limits associated with the blowers, wherein the monitoring device is configured to obtain the designated speed limits based on plural different baseline relationships between different rotational speeds at which the different blowers operate when supplied with corresponding different amounts of electric energy, wherein the monitoring device is configured to modify the plural different baseline relationships by measuring one or more additional rotation speeds of the different blowers at one or more additional amounts of electric energy during operation of the different blowers and updating the plural baseline relationships based on the one or more additional rotation speeds, and wherein the monitoring device is configured to modify the plural baseline relationships by measuring the one or more additional rotation speeds only when the vehicle is stationary or dynamic brakes of the vehicle are applied.

15. The system of claim 14, wherein the monitoring device is configured to obtain the designated speed limits based on the plural different baseline relationships between the different rotational speeds at which the different blowers operate when supplied with corresponding different amounts of electric energy and when the one or more inlet ducts are unblocked, the different baseline relationships associated with the respective different blowers.

16. The system of claim 15, wherein the different baseline relationships are individually customized for the respective blowers.

17. A method comprising: using at least one processor to:
measure electric energy that is supplied to a blower to power the blower, wherein the blower is included in a vehicle to cool dynamic braking grids of the vehicle, the blower powered to draw air through an inlet duct and over one or more bodies to cool the bodies, wherein the blower, inlet duct, and one or more bodies are associated with a powered system;
measure a rotation speed at which the blower operates to draw the air through the inlet duct and over the one or more bodies when the blower is powered with the electric energy;
modify a baseline relationship by measuring one or more additional rotation speeds of the blower at one or more additional amounts of electric energy during operation of the blower and update the baseline relationship based on the one or more additional rotation speeds;
modify the baseline relationship by measuring the one or more additional rotation speeds only when the vehicle is stationary or dynamic brakes of the vehicle are applied;
determine if the inlet duct is at least partially blocked based on the electric energy and the rotation speed that are measured; and
responsive to a determination that the inlet duct is at least partially blocked, control a sub-system of the powered system.

18. A tangible and non-transitory computer readable storage medium for a system that includes a processor, the tangible and non-transitory computer readable storage medium including one or more sets of instructions that direct the processor to:
measure a first amount of electric energy that is supplied to a blower of the system to power the blower, wherein the blower is included in a vehicle to cool dynamic braking grids of the vehicle, the blower powered to draw air through an inlet duct and over one or more bodies to cool the bodies;
measure a first rotation speed at which the blower operates to draw the air through the inlet duct and over the one or more bodies when the blower is powered with the first amount of electric energy;
compare the first rotation speed of the blower with a designated speed limit that is associated with the first amount of electric energy to determine if the inlet duct is at least partially blocked;
obtain the designated speed limit based on a baseline relationship between different rotational speeds at which the blower operates when supplied with corresponding different amounts of electric energy;
modify the baseline relationship by measuring one or more additional rotation speeds of the blower at one or more additional amounts of electric energy during operation of the blower and updating the baseline relationship based on the one or more additional rotation speeds;
modify the baseline relationship by measuring the one or more additional rotation speeds only when the vehicle is stationary or dynamic brakes of the vehicle are applied; and identify the inlet duct as being at least partially blocked when the first rotation speed exceeds the designated speed limit.

* * * * *